Figure 3:
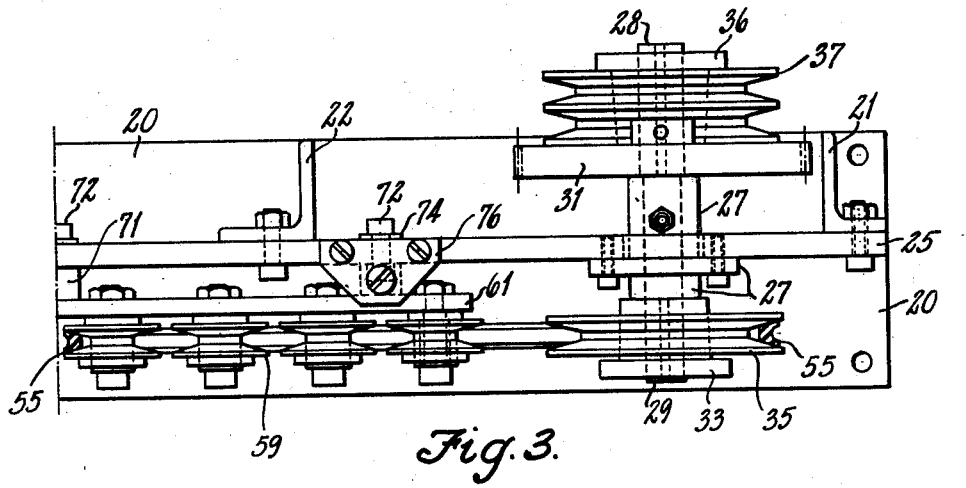

May 24, 1955  B. E. FRANK ET AL  2,709,000
TUBING PULL-OUT

Filed Aug. 13, 1949  3 Sheets-Sheet 1

INVENTORS
Bernard E. Frank
John W. Armstrong
by Spencer Hardman Fehr
their ATTORNEYS INVENTORS
Bernard E. Frank
John W. Armstrong
by Spencer Hardman & Fehr
their ATTORNEYS

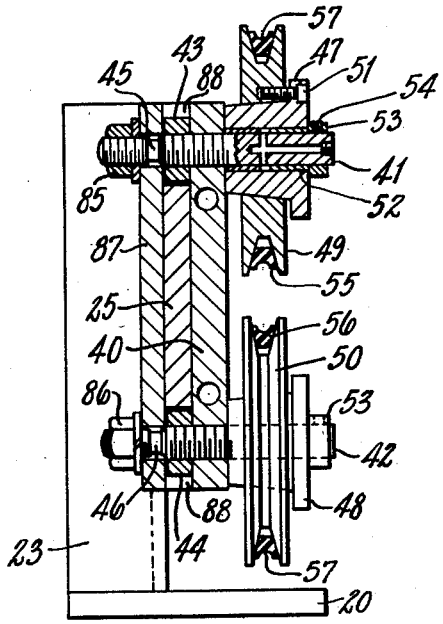
Fig. 6.
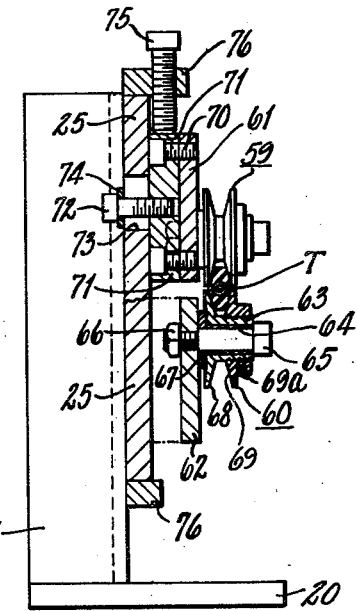
Fig. 7.
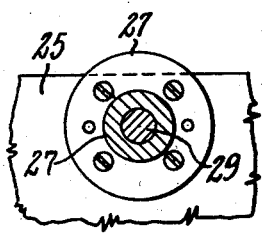
Fig. 9.
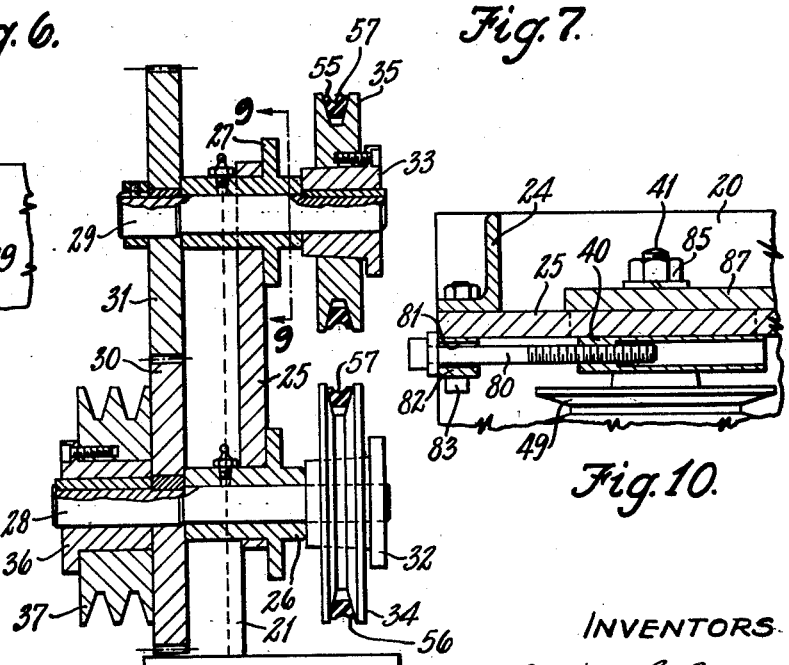
Fig. 8.
Fig. 10.
INVENTORS
Bernard E. Frank
John W. Armstrong
by Spencer Hardman & Fisher
their ATTORNEYS.

United States Patent Office 2,709,000
Patented May 24, 1955

2,709,000

TUBING PULL-OUT

Bernard E. Frank and John W. Armstrong, Rochester, N. Y., assignors to General Motors Corporation, Detroit, Mich., a corporation of Delaware Application August 13, 1949, Serial No. 110,102

6 Claims. (Cl. 203—227)

This invention relates to the manufacture of tubing, for example, butt-welded steel tubing or two-ply copper brazed tubing.

An object of the invention is to provide a power driven tubing pull-out which will take up the slack in the tubing as it passes through the mill.

In the disclosed embodiment of the present invention, this object is accomplished by the use of two traction belts having tubing-gripping portions which are moved in the same direction and at the same speed, and are guided for movement in parallelism and in contact with the tubing by grooved wheels. During use of the pull-out, the tubing wears grooves in the belts. Adjustments of the wheel supports are made to compensate for the deepening of the grooves; and the spacing of the flanges of the wheels can be adjusted so that the tubing-gripping portions of the belts are more uniformly effective to apply traction to the tubing.

Further objects and advantages of the present invention will be apparent from the following description, reference being had to the accompanying drawings, wherein a preferred embodiment of the present invention is clearly shown.

Figure 1:
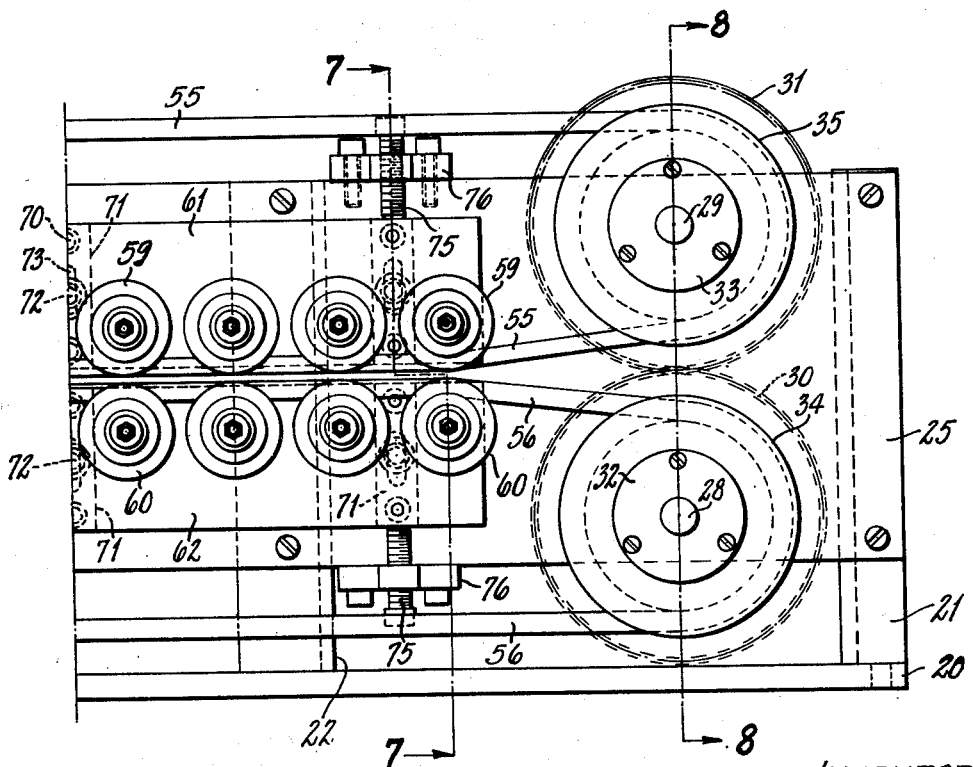
Figure 4:
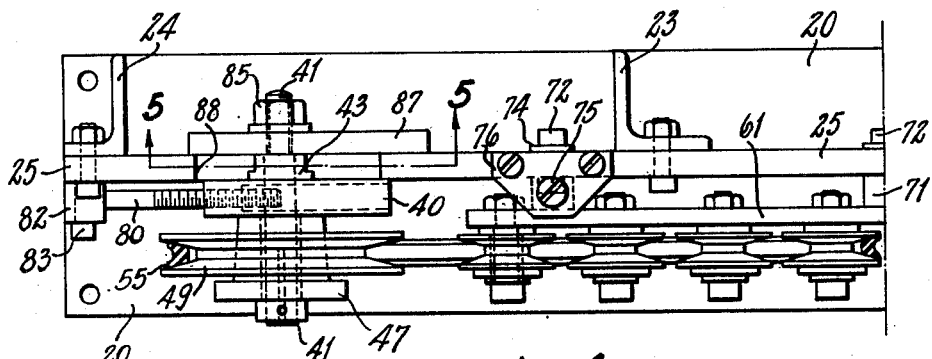
Figure 2:
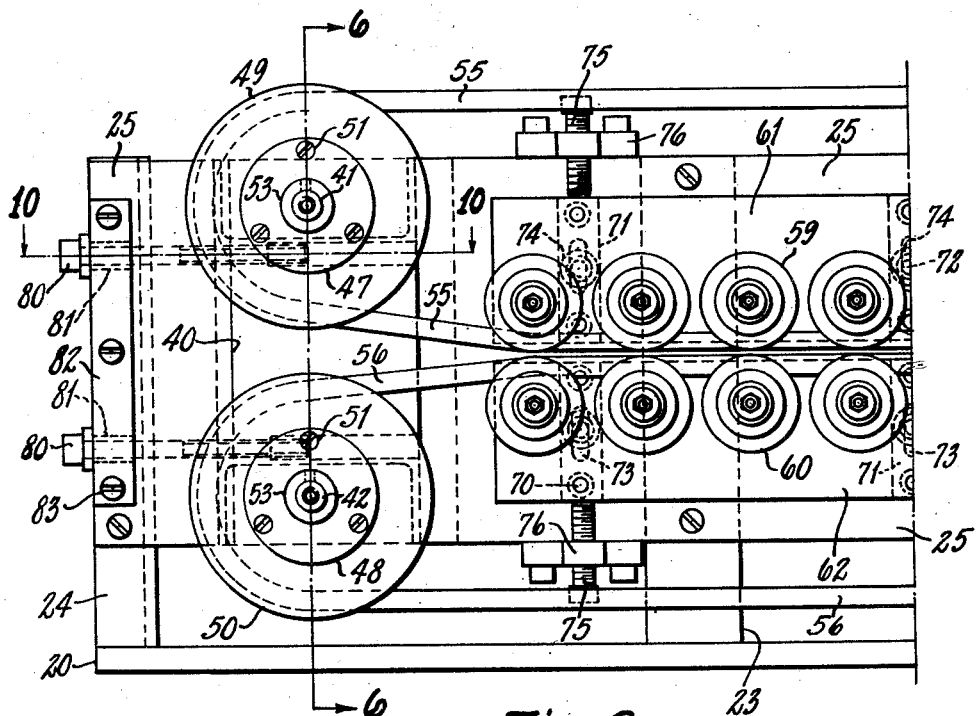
Figure 5:
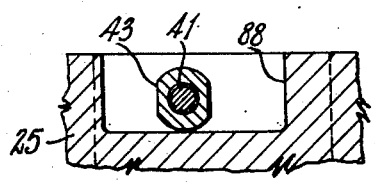

In the drawings:

Figs. 1 and 2 form a side view of the tubing pull-out.
Figs. 3 and 4 form a top view.
Fig. 5 is a fragmentary, sectional view on the line 5—5 of Fig. 4.
Fig. 6 is a sectional view on the line 6—6 of Fig. 2.
Fig. 7 is a sectional view on the line 7—7 of Fig. 1.
Fig. 8 is a sectional view on the line 8—8 of Fig. 1.
Fig. 9 is a sectional view on the line 9—9 of Fig. 8.
Fig. 10 is a sectional view on the line 10—10 of Fig. 2.

The device comprises a base plate 20 (Figs. 1 and 2) supporting angles 21, 22, 23 and 24. (See also Figs. 3 and 4.) These angles support a plate 25 which, as shown in Fig. 8, supports bearings 26 and 27 for shafts 28 and 29, respectively, connected with meshing gears 30 and 31, respectively, and with pulley hubs 32 and 33 attached to grooved pulleys 34 and 35, respectively. The shaft 28 is connected with a pulley hub 36 connected with a grooved pulley 37 which is to receive V-belts which transmit power from a source such as an electric motor which through a speed reducer and a torque-limiting clutch (not shown) drives a grooved pulley belt connected with pulley 37.

Referring to Fig. 6, the plate 25 supports a plate 40 into which studs 41 and 42 are screwed, said studs receiving nuts 43 and 44 which are tightened while a wrench is applied to the flat portions 45 and 46 of these studs. Studs 41 and 42 provide journals for pulley hubs 47 and 48, respectively, to which grooved pulleys 49 and 50, respectively, are attached by screws 51. Bearing bushings 52 are press-fitted into each of the hubs 47 and 48. The hubs are retained on the studs by collars 53 retained by set screws 54. Similar V-belts 55 and 56 are supported in the same plane by pulleys 35, 49 and 34, 50, respectively. The portions of the belts 55 and 56 located between pulleys 34, 35 and pulleys 49, 50 are guided for movement for a substantial distance in parallelism and in closely spaced relation by means of sets of grooved guide wheels 59 and 60 which are located in straight rows and are supported, respectively, by plates 61 and 62. These belt portions move in the same direction and at the same speed. The pull-out is located, for example, between a device which performs an operation upon the tubing, such as tinning, and a device which cuts the tubing into lengths. These devices determine the path of longitudinal movement of the tubing. The pull-out is so located that the belts are aligned with the path of movement of the tubing; and it operates, for example, to unwind the tubing from a supply reel and to cause it to pass through fluxing and tinning baths and to a cutting device. Initially the tubing engaging surfaces of the belts are flat and the tubing wears its own grooves indicated at 57 in Figs. 6 and 7. The life of the belts is longer than the life of belts initially provided with grooves.

Each of the wheels 59, 60 comprises a hub 63 providing a bearing bushing 64 journaled on a stud 65, threaded into supporting plates 61 and 62 and secured by a nut 66. A spacing washer 67 is located between the flange 68 of hub 63 and the supporting plate. The end flange 69 of the wheel is screwed onto the hub 63 and is retained in the required position by a set screw 69a (Fig. 7). By turning flange 69 relative to flange 68, the distance between the belt and the pulley axis can be changed in order that the level of the belt can be adjusted. In this way the contiguous portions of the belts are located parallel to each other and all portions of the belts passing between pulleys 59 and 60 are effective to grip the tubing. The end play between the hub of flange 68 and washer 67 and the head of stud 65 is sufficient to allow the belt to align the pulleys with respect to a vertical plane. If the pulleys were not properly adjusted as described, the tubing might be deformed and the power required to operate the pull-out device would be unnecessarily excessive. To each of the plates 61 and 62, screws 70 secure three bars 71 each threadedly engaged by a screw 72 passing through a slot 73 in plate 25 and through a washer 74 which overlaps the slot. Each bar 71 is engaged by a screw 75 threaded through a bracket 76 attached to plate 25. By adjusting the screws 75 the plates 61 and 62 are adjusted vertically so as to obtain the correct spacing between the upper guide wheels 59 and the lower guide wheels 60 so that the traction by the belts upon the tubing will be sufficient. Adjustments are made at intervals as the grooves 57 become deeper. After adjustments are made, the screws 72 are tightened thereby clamping the bars 71, attached to the plates 61 and 62 to the plate 25. The belts are serviceable at least until the grooves have been worn so deep that the belts engage each other along the side of the tubing. A little more service can be obtained by adjusting the flanges 69 of the wheels closer to the flanges 68 so that the belts are compressed to cause them to grip the tubing.

Referring to Figs. 2, 4 and 6, the plate 40 carrying the idle pulleys 49 and 50 can be adjusted edgewise to take up the slack in the belts 55 and 56. For this purpose, screws 80 are provided which pass through holes 81 larger than the shanks of screws 80 in a bar 82 which screws 83 attach to plate 25. Screws 80 threadedly engage the plate 40, as shown in Fig. 10. Since the screws 80 have a loose fit in bar 82, plate 40 can be adjusted by the lower screw 80 to take up the slack of belt 56 and then by the upper screw 80 to take up the slack in belt 55. Plate 40 is then secured in adjusted position by the tightening of nuts 85 and 86 threaded on studs 41 and 42, respectively. The tightening of screws 85 forces a bar 87 against plate 25 and forces plate 40 against plate 25. As shown in Figs. 5 and 6, plate 25 is provided with notch 88 for receiving the nuts 43 and 44.

Obviously the apparatus described could be used to move a solid rod as well as a hollow tube.

While the embodiment of the present invention as herein disclosed, constitutes a preferred form, it is to be understood that other forms might be adopted.

What is claimed is as follows:

1. A power driven apparatus for moving an article such as a tube or rod longitudinally having in combination two driving belts adapted to be driven by a suitable source of power, means for so guiding the belts that portions thereof extend for a substantial distance parallel to each other and sufficiently close together to engage the article to be moved, said means including a plurality of guide wheels over which the driving belts pass, means for simultaneously moving the plurality of guide wheels toward or away from the article to be moved so as to cause said article to be gripped by the driving belts, means for individually adjusting the guide wheels to change the position of the periphery of said wheels which is engaged by the driving belts with respect to the article to be moved while the axis of rotation of said guide wheels remains unchanged in order to accurately control the pressure of the driving belts on said article and means for moving the driving belts in the same direction and at the same speed.

2. A power driven apparatus for moving an article such as a tube or rod longitudinally having in combination two driving belts adapted to be driven by a suitable source of power, means for so guiding the belts that portions thereof extend for a substantial distance parallel to each other and sufficiently close together to engage the article to be moved, said means including a plurality of guide wheels over which the driving belts pass, means for simultaneously moving the plurality of guide wheels toward or away from the article to be moved so as to cause said article to be gripped by the driving belts, means for individually adjusting the guide wheels to change the position of the periphery of said wheels which is engaged by the driving belts with respect to the article to be moved while the axis of rotation of said guide wheels remains unchanged in order to accurately control the pressure of the driving belts on said article, means for actuating the driving belts at the same speed and supporting means for said guide wheels, said supporting means being so constructed that a limited axial movement is permitted in order to enable the wheels to be aligned by engagement of the driving belts therewith.

3. A power driven apparatus for moving an article such as a tube or rod longitudinally having in combination two driving belts adapted to be driven by a suitable source of power, means for so guiding the belts that portions thereof extend for a substantial distance parallel to each other and sufficiently close together to engage the article to be moved and for driving said belts, said means including a supporting plate, a plurality of guide wheels rotatably mounted on said plate, over which the driving belts pass, a plurality of rotatably mounted driving wheels and a plurality of idle wheels also rotatably mounted on a second supporting plate and engaging said belts, means for simultaneously moving the plurality of guide wheels toward or away from the article to be moved so as to cause said article to be gripped by the driving belts, means for individually adjusting the guide wheels to change the position of the periphery of said wheels which is engaged by the driving belts with respect to the article to be moved while the axis of rotation of said guide wheels remains unchanged in order to accurately control the pressure of the driving belts on said article, means for adjusting the second supporting plate to move the idle wheels toward and away from the driving wheels so as to regulate the amount of slack in the driving belts and means for rotating the driving wheels so as to move the driving belts in the same direction and at the same speed.

4. A power driven apparatus for moving an article such as a tube or rod longitudinally having in combination two driving belts adapted to be driven by a suitable source of power, means for so guiding the belts that portions thereof extend for a substantial distance parallel to each other and sufficiently close together to engage the article to be moved, and for driving said belts, said means including a supporting plate, a plurality of guide wheels rotatably mounted on said plate, over which the driving belts pass, a plurality of driving wheels, a second supporting plate, idle wheels rotatably mounted on said plate and engaging said belts, means for simultaneously moving the first supporting plate toward and away from the driving belt so as to simultaneously move all of the plurality of guide wheels toward or away from the article to be moved, means for individually adjusting the guide wheels to change the position of the periphery of said wheels which is engaged by the driving belts with respect to the article to be moved while the axis of rotation of said guide wheels remains unchanged in order to accurately control the pressure of the driving belts on said article, means for effecting slight axial adjustment of the guide wheels and means for rotating the driving wheels so as to move the driving belts in the same direction and at the same speed.

5. A power driven apparatus for moving an article such as a tube or rod longitudinally having in combination two driving belts adapted to be driven by a suitable source of power, means for so guiding the belts that portions thereof extend for a substantial distance parallel to each other and sufficiently close together to engage the article to be moved, said means including a plurality of guide wheels over which the driving belts pass, means for simultaneously moving the plurality of guide wheels toward or away from the article to be moved so as to cause said article to be gripped by the driving belts, said guide wheels having flanges relatively adjustable axially to form between them a V-shaped groove in which the driving belt is received and the width of which is varied in accordance with the adjustment of said flange to control the gripping pressure of the belt on the article moved thereby, means for returning the flanges in adjusted position and means for moving the driving belts in the same direction and at the same speed.

6. A power driven apparatus for moving an article such as a tube or rod longitudinally having in combination two driving belts adapted to be driven by a suitable source of power, means for so guiding the belts that portions thereof extend for a substantial distance parallel to each other and sufficiently close together to engage the article to be moved, and for driving said belts, said means including a main supporting plate having a plurality of fixed studs on which driving wheels are rotatably mounted, a supplemental supporting plate adjustably mounted on said main supporting plate and having a plurality of guide wheels rotatably mounted thereon, means whereby said supplemental plate can be moved toward and away from the article to be moved to cause said belts to grip said article with sufficient force, means for retaining the supplemental plate in any adjusted position, a second supplemental plate adjustably mounted on the main supporting plate and having idle wheels rotatably mounted thereon over which the driving belts pass, means whereby said last named plate may be adjusted longitudinally with respect to the main supporting plate to control the extent of slack in the driving belt, and means for rotating the driving wheels so as to move the driving belts in the same direction and at the same speed.

References Cited in the file of this patent

UNITED STATES PATENTS

| Number | Name | Date |
|---|---|---|
| 774,530 | Oppenheim | Nov. 8, 1904 |
| 779,980 | Whitaker | Jan. 10, 1905 |
| 1,786,779 | Quick | Dec. 30, 1930 |
| 2,135,806 | Fermann et al. | Nov. 8, 1938 |
| 2,254,380 | Mitchell | Sept. 2, 1941 |
| 2,372,646 | Barnby et al. | Apr. 3, 1945 |
| 2,438,448 | Morton et al. | Mar. 23, 1948 |
| 2,523,836 | Le Tourneau | Sept. 26, 1950 |